No. 634,578. Patented Oct. 10, 1899.
F. KAUCHER.
BRUSH ATTACHMENT FOR POWER GRAIN SHOVELS.
(Application filed Feb. 20, 1899.)
(No Model.)

WITNESSES:
Herbert Bradley
H. H. Halsted

INVENTOR
Frank Kaucher
BY John J. Halsted & Son
his ATTORNEYS.

THE NORRIS PETERS CO., PHOTO-LITHO., WASHINGTON, D. C.

UNITED STATES PATENT OFFICE.

FRANK KAUCHER, OF ST. JOSEPH, MISSOURI.

BRUSH ATTACHMENT FOR POWER GRAIN-SHOVELS.

SPECIFICATION forming part of Letters Patent No. 634,578, dated October 10, 1899.

Application filed February 20, 1899. Serial No. 706,176. (No model.)

*To all whom it may concern:*

Be it known that I, FRANK KAUCHER, of St. Joseph, in the county of Buchanan and State of Missouri, have invented certain new and useful Improvements in Brush Attachments for Power Grain-Shovels; and I do hereby declare that the following is a full, clear, and exact description of the invention, which will enable others skilled in the art to which it appertains to make and use the same, reference being had to the accompanying drawings, and to letters of reference marked thereon, which form a part of this specification.

In the unloading of grain from cars by means of power grain-shovels much time is lost in gathering up by hand-labor and with ordinary brooms such of the grain as is left on the car-floor and which the shovel at the close of its work fails to pick up and dispose of.

The object of my invention is to effect the finishing up of the unloading of the grain by means of a brush apparatus applied to the power-shovel and in such manner that it can readily be attached to or detached from it or may be swung or thrown up against the back of the shovel to be put out of use when not wanted and be swung down and held to its proper place when it is to be brought into use, and may also be adjusted as need be to compensate for the wear of the brush, the construction being also such that grain in the corners of the car may be brushed out.

The drawings illustrate practicable and simple devices for effecting these ends.

Figure 1:
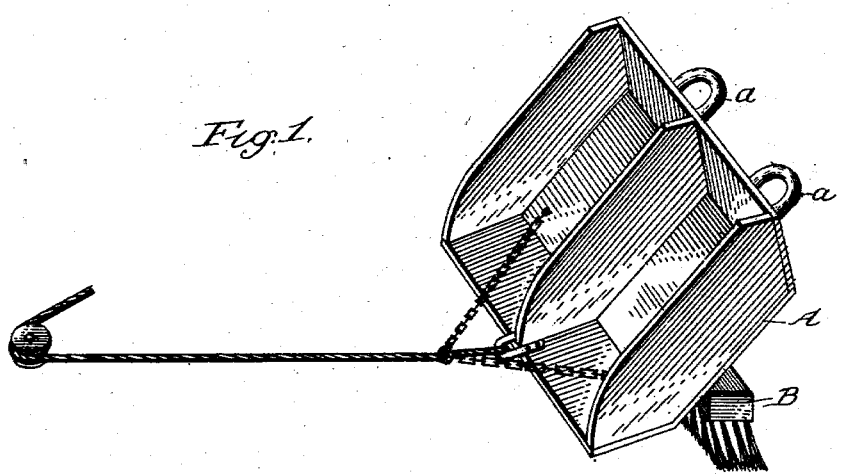
Figure 2:
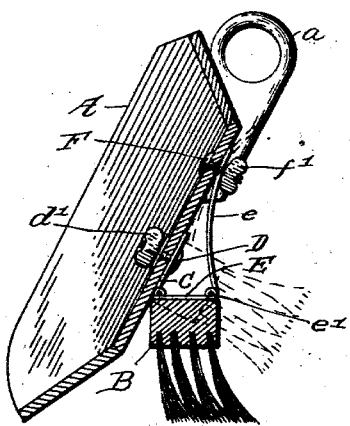
Figure 3:
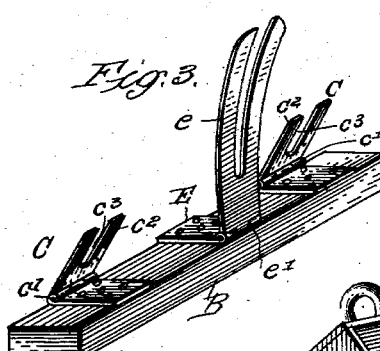
Figure 4:
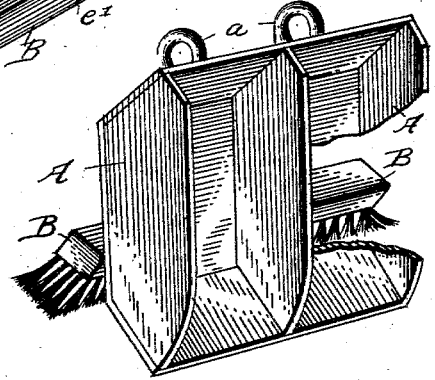

Figure 1 represents a power grain-shovel with a rope or chain attached by means of which the shovel may be pulled forward by any suitable mechanism, not needed to be shown, as I make no claim either to the shovel itself or to the power mechanism. Fig. 2 illustrates a cross-section of my brush devices attached to such a shovel, the shovel being also in cross-section. Fig. 3 illustrates in perspective a brush-block and its slotted hinges by means of which it may be removably secured for use to the back of the shovel; Fig. 4, a perspective view of the shovel and its brush in position thereon for use, and Fig. 5 a detail showing the lateral extension of the brush at its ends.

The shovel A and its handle $a'$ need no detailed description.

B indicates a wooden brush-block of a length to extend across the shovel, the brush itself being omitted in Fig. 3, as it is shown in some of the other figures. C C are metal hinges, one leaf of which is screwed or otherwise secured to one side or face of this block near its ends, the hinge-joint $c'$ of each hinge being at or near the edge of the block, as shown. The free leaves $c^2$ of these hinges are slotted or recessed, as shown at $c^3$, to facilitate their being readily secured to the shovel by means of threaded bolts D and thumb-nuts $d'$, the bolts extending, as shown in Fig. 2, through a bolt-hole in the back of the shovel. E is a similar hinge applied to the block between C C, but in a position the reverse of C C, and so that its hinge-joint is at that edge of the block which is opposite to the joints $c'$. The free leaf $e'$ of hinge E is also slotted and is longer than leaves $c^2$ to permit it to be secured to the back of the shovel by its bolt F and thumb-nut $f'$. When the block and its brush are so applied and the thumb-nuts tightened, with the position of the parts as shown in Fig. 2, the block is held firmly for use. The slots and thumb-screws or bolts permit any desired vertical adjustment of the brush-block, either in setting them or to compensate for wear.

The dotted lines in Fig. 2 show the position of the block and brush when turned up out of use. This change of position is effected by simply loosening the thumb-nuts F and turning the block upward on its hinges $c'$. This lifts the slotted leaf $e^2$, which is then secured by its thumb-nut $f'$. The brush should extend about an inch or an inch and a half below the lower edge of the shovel.

The filling of the brush may be of any suitable durable material—say, for instance, ratan or kindred material.

Figure 5:

Referring now more particularly to Fig. 5, it will be seen that the brush at each of its ends extends laterally outside the shovel, say, a distance of six inches. The object of this is that the operator may more easily brush out the corners of the car; but it will be understood that this corner cleaning and the use of the brush will be needed only to finish up the unloading of grain-cars, inasmuch as the bulk of the grain will be taken out by the shovel.

I claim—

1. A brush attachment for power grain-shovels, comprising a brush and its block, hinges thereon having each a slotted leaf, such hinges being applied to the block as and for the purposes set forth.

2. The combination with a power grain-shovel, of a brush hinged on the back of the shovel and adapted to be swung down to be brought into position for use, or to be swung up out of use, substantially as set forth.

3. In combination with a power grain-shovel, the described removable brush, hinges thereon each having one of its leaves secured thereto, and fastening-screws serving to hold the block removably to the bottom of the shovel, substantially as set forth.

FRANK KAUCHER.

Witnesses:
J. G. SCHNEIDER,
O. J. ALBRECHT.